G. WEATHERBY.
LATHE CENTER AND DRIVER.
APPLICATION FILED FEB. 7, 1920.
1,361,120.
Patented Dec. 7, 1920.
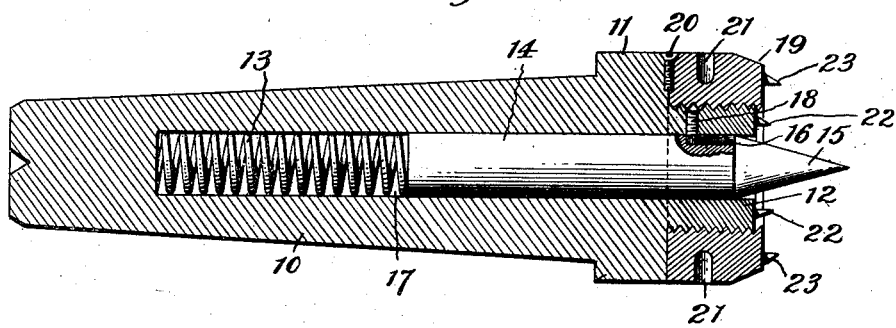
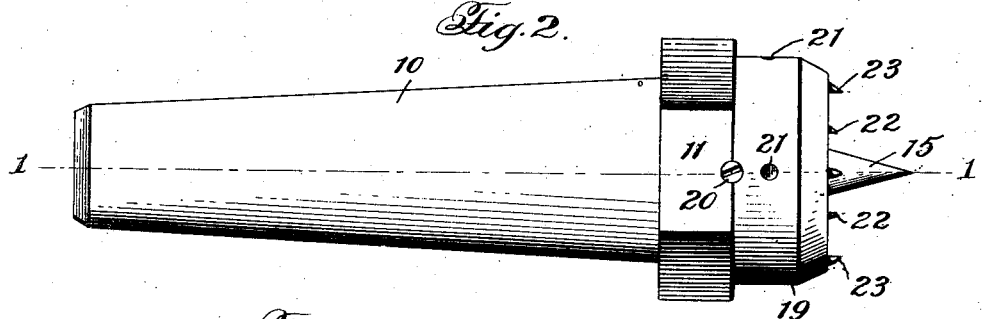
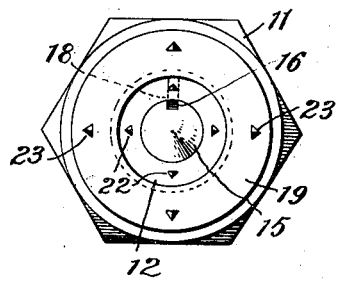
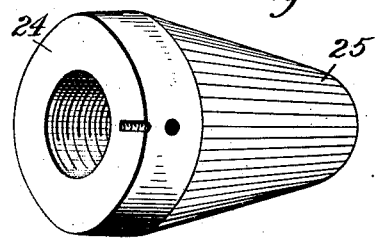
Witness:
Jas. E. Hutchinson.
Inventor
George Weatherby
By Harold C. Thorne
Attorney

UNITED STATES PATENT OFFICE.

GEORGE WEATHERBY, OF ELYRIA, OHIO.

LATHE CENTER AND DRIVER.

1,361,120.     Specification of Letters Patent.     Patented Dec. 7, 1920.

Application filed February 7, 1920. Serial No. 356,850.

*To all whom it may concern:*

Be it known that I, GEORGE WEATHERBY, a citizen of the United States, residing at Elyria, in the county of Lorain and State of Ohio, have invented certain new and useful Improvements in Lathe Centers and Drivers, of which the following is a specification.

This invention relates to lathe centers and drivers and is primarily intended to be used in connection with metal work, and the main object is to provide a device with means for centering the work and firmly gripping it.

Another object of the invention is to provide such a lathe centering device and drive as will receive work of greater or less diameter, and have sets of gripping elements whereby material of large diameter may be held as effectively as that of a smaller diameter.

A further object of the invention is to provide such a lathe centering tool and drive with interchangeable working ends whereby either material of solid or hollow stock may be used with the centering tool.

Further objects and details of the invention will appear as described in connection with the accompanying drawings, and hereinafter set forth and claimed.

Referring to the drawings, forming part of this specification, like numerals designate corresponding parts in the four figures, in which, Figure 1 is a cross-sectional view taken longitudinally of the device, Fig. 2 is a longitudinal elevation of the same, Fig. 3 is a right-hand end elevation of the device, and Fig. 4 is a perspective view of an auxiliary centering end to be used in connection with the device.

In the drawing reference numeral 10 designates a tapered center which is adapted to fit in the spindle of a lathe in the usual manner. This center 10 has a portion 11 of polygonal shape whereby a wrench can be used to remove it from the spindle if desired, and a cylindrical portion 12 is threaded to receive various forms of chuck members hereinafter described.

The center 10 is provided with a bore 13 extending along its axis for receiving a slidable center pin 14. The center pin 14 has a tapered point 15 for receiving work stock, and is slotted at 16. A compression spring 17 is placed in the bore to bear against the center pin 14 to force it outward, and a stop member in the form of a machine screw 18 extending through the cylindrical threaded portion 12 of the center engages in the slot 16 for guiding the center pin and limiting the extent of its outward projection.

An annular collar or driving member 19 is mounted on the cylindrical threaded portion 12 and may be locked in its operating position in any desired manner as by a locking screw 20 positioned in a threaded aperture formed between it and the portion 11 of the center. The drive member may be provided with apertures 21 for receiving a wrench for operating it.

On the outer ends of the cylindrical threaded member 12 are a plurality of sharp gripping points 22, and on the drive member 19 is a similar set of points 23 which extend beyond the points 22.

The operation of the centering tool is as follows: the work which has been prepared in the usual manner, is placed against the tapered point of the center pin 14, then it is forced toward the spindle, compressing the center pin until it engages one of the sets of gripping points, 22 or 23. It will be seen that work of large diameter will be engaged by the points 23, whereas work of a smaller diameter will be engaged by points 22. The sets of points 22 and 23, are each four in number in the preferred construction, as a few sharp gripping points can be made to grip the work more effectually than a plane surface corrugated with such points, and they may be used in operating comparatively hard metal. However it is within the scope of the invention to provide a different number of points and various sets of gripping elements which project farther as the distance from the axis increases.

Fig. 4 illustrates a form of auxiliary centering end comprising a collar 24 and working element 25 which can be substituted for the collar element 19 when it is desired to center and grip hollow work in the lathe. This attachment is formed to fit on the threaded cylindrical portion 12 of the center in the same manner as the member 19. The outer end is illustrated as being tapered and corrugated as shown at 25.

In reduction to practice, I have found that the form of my invention illustrated in the drawings and referred to in the above description, as the preferred embodiment, is the most practical; yet realizing that the conditions concurrent with the adoption of my device will necessarily vary, I desire to emphasize the fact that various minor changes in details of construction, proportion and arrangement of parts, may be resorted to, when required, without sacrificing any of the advantages of my invention as defined in the following claims:

1. A lathe center and drive comprising a center having a longitudinally sliding center pin for centering work placed in the lathe, and sets of gripping elements projecting varying degrees adapted to engage the work for holding it in fixed relation with the center.

2. A lathe center and drive comprising a center having a longitudinally sliding center pin for centering work placed in the lathe, and sets of gripping elements projecting to different planes transverse of the axis of the center, elements nearer the axis extending to a plane closer to the end of the center than those at a greater radius, whereby work of different diameters may be effectively held in fixed relation with the center.

3. A lathe center having sets of gripping elements projecting to different planes transverse of the axis of the center, elements nearer the axis extending to a plane closer to the end of the center than those at a greater radius, whereby work of different diameters may be effectively held in fixed relation with the center.

4. A lathe center and drive comprising a center having a longitudinally sliding center pin adapted to extend therefrom for centering work placed in the lathe, said center formed with a cylindrical extension, a set of gripping elements on the end of the center extending to a plane beyond the end thereof and transverse of the axis of the center, a collar adapted to be fastened on said cylindrical extension, and a set of gripping elements on said collar which will extend to a plane transverse of the axis of said center and at a greater distance from it than the first said plane.

5. A lathe center having a cylindrical portion adjacent to its outer end, a collar element adapted to be fastened on said cylindrical portion, means on said cylindrical portion of the center and on the collar for engaging work in the lathe, and a spring pressed center pin adapted to properly locate the work in the lathe before it is engaged by said work engaging means.

6. A lathe center comprising a conical portion adapted to be positioned in the spindle of a lathe, an enlarged portion at the outer end of the conical portion adapted to be engaged by a wrench for removing it from the spindle, a cylindrical portion at the end of the center adapted to receive a collar provided with work engaging elements, and a sliding centering element normally extending beyond said cylindrical portion.

In testimony whereof I affix my signature.

GEORGE WEATHERBY.